(12) United States Patent
Umezuki

(10) Patent No.: US 8,984,088 B2
(45) Date of Patent: Mar. 17, 2015

(54) COMMUNICATION CONTROL APPARATUS, COMMUNICATION SYSTEM, INFORMATION PROCESSING APPARATUS, AND COMMUNICATION CONTROL METHOD

(75) Inventor: Takeshi Umezuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 303 days.

(21) Appl. No.: 13/290,418

(22) Filed: Nov. 7, 2011

(65) Prior Publication Data

US 2012/0179776 A1 Jul. 12, 2012

(30) Foreign Application Priority Data

Jan. 12, 2011 (JP) ................................. 2011-003546

(51) Int. Cl.
| | | |
|---|---|---|
| G06F 15/16 | (2006.01) | |
| H04L 12/931 | (2013.01) | |
| H04L 29/06 | (2006.01) | |
| H04L 29/12 | (2006.01) | |
| H04L 29/08 | (2006.01) | |

(52) U.S. Cl.
CPC .............. *H04L 49/357* (2013.01); *H04L 63/10* (2013.01); *H04L 63/0428* (2013.01); *H04L 61/2038* (2013.01); *H04L 61/6022* (2013.01); *H04L 67/1097* (2013.01)
USPC ......................................... 709/217; 370/390

(58) Field of Classification Search
None
See application file for complete search history.

(56) References Cited

U.S. PATENT DOCUMENTS

| | | | | |
|---|---|---|---|---|
| 5,222,242 A | * | 6/1993 | Choi et al. | 709/227 |
| 5,511,208 A | * | 4/1996 | Boyles et al. | 709/223 |
| 6,148,342 A | * | 11/2000 | Ho | 709/225 |
| 6,665,714 B1 | * | 12/2003 | Blumenau et al. | 709/222 |
| 7,599,397 B2 | | 10/2009 | Holland | |
| 7,685,223 B1 | * | 3/2010 | Basavaiah et al. | 709/200 |
| 2002/0141401 A1 | * | 10/2002 | Albert et al. | 370/389 |

(Continued)

FOREIGN PATENT DOCUMENTS

| | | |
|---|---|---|
| JP | 2002-529804 A | 9/2002 |
| JP | 2004-56728 A | 2/2004 |

(Continued)

OTHER PUBLICATIONS

"Extended European Search Report" (EESR) mailed by EPO and corresponding to European Patent Application No. 11189316.0 on May 3, 2012.

(Continued)

*Primary Examiner* — Farid Homayounmehr
*Assistant Examiner* — Christopher C Harris
(74) *Attorney, Agent, or Firm* — Fujitsu Patent Center

(57) ABSTRACT

In a communication control apparatus, a first receiving unit receives a registration request packet which is generated so as to enable the communication control apparatus to recognize an access requested apparatus, and if determining that the access requested apparatus recognized from the registration request packet exists in a network, registers first identification information identifying an access requesting apparatus which is included in the registration request packet, in a storage unit. A second receiving unit receives an explorer packet, and if determining that first identification information included in the explorer packet has been registered in the storage unit, sends second identification information identifying the own apparatus to the access requesting apparatus.

18 Claims, 12 Drawing Sheets

(56) References Cited

U.S. PATENT DOCUMENTS

| | | | |
|---|---|---|---|
| 2003/0229689 A1* | 12/2003 | Raghavan et al. | 709/223 |
| 2004/0019686 A1 | 1/2004 | Toyoda et al. | |
| 2006/0146826 A1* | 7/2006 | Namihira | 370/392 |
| 2007/0047467 A1 | 3/2007 | Enoki et al. | |
| 2009/0052461 A1* | 2/2009 | Brown et al. | 370/401 |
| 2009/0245791 A1* | 10/2009 | Thaler et al. | 398/45 |
| 2009/0252181 A1* | 10/2009 | Desanti | 370/474 |
| 2009/0292813 A1* | 11/2009 | Snively et al. | 709/228 |
| 2010/0017497 A1* | 1/2010 | Brown et al. | 709/217 |
| 2010/0223397 A1* | 9/2010 | Elzur | 709/235 |
| 2010/0232419 A1* | 9/2010 | Rivers | 370/352 |
| 2010/0325710 A1* | 12/2010 | Etchegoyen | 726/7 |

FOREIGN PATENT DOCUMENTS

| | | |
|---|---|---|
| JP | 2004-362600 A | 12/2004 |
| JP | 2007-67690 A | 3/2007 |
| JP | 2007-179529 A | 7/2007 |
| WO | WO-00/00889 | 1/2000 |

OTHER PUBLICATIONS

Cisco, "Fiber Channel over Ethernet Initialization Protocol"; Sep. 30, 2009, pp. 1-12.

Claudio DeSanti et al.; "FCoE Initialization Protocol (FIP)"; Apr. 30, 2008, pp. 1-34.

* cited by examiner

462 CONNECTED DEVICE LIST

| WWN | PORT NUMBER | DEVICE TYPE |
|---|---|---|
| 50:00:00:0b:5c:61:13:3d | 1 | Diskarray |
| ⋮ | ⋮ | ⋮ |

FIG. 8

COMMUNICATION CONTROL APPARATUS, COMMUNICATION SYSTEM, INFORMATION PROCESSING APPARATUS, AND COMMUNICATION CONTROL METHOD

CROSS-REFERENCE TO RELATED APPLICATION

This application is based upon and claims the benefits of priority of the prior Japanese Patent Application No. 2011-003546, filed on Jan. 12, 2011, the entire contents of which are incorporated herein by reference.

FIELD

The embodiments discussed herein relate to a communication control apparatus, communication system, information processing apparatus, and communication control method.

BACKGROUND

Fibre Channel (FC) is standardized as typical communication standards that are used for Storage Area Network (SAN) where storage devices and computers such as servers are connected. In addition, Fibre Channel over Ethernet (FCoE) standards are also known, where FC frames are encapsulated in Ethernet frames and then transmitted.

According to the FC standards, a device such as a server logs in with an FC fabric before communicating with a device existing in the FC fabric. On the other hand, the FCoE standards introduce the "FCoE Initialization Protocol (FIP)" to provide a service for a node on an Ethernet to log in with an FC fabric. Preparation for a login using the FIP is made as follows. An ENode which is a node on an Ethernet searches for an FCoE switch by using Ethernet multicast. The FCoE switch sends the Media Access Control (MAC) address of the own device by unicast to the ENode in response to the multicast packet from the ENode. The ENode connects with the FCoE switch by using the MAC address received from the FCoE switch, and then logs in with the FC fabric connected to the FCoE switch.

One example for controlling access to a storage device in a storage system is that information on higher-level apparatuses which are permitted to access the storage device is previously registered in a control apparatus controlling the storage device, and the control device, when receiving an access from a higher-level apparatus, compares information identifying the higher-level apparatus extracted from a received access command with the previously registered information. Another example is that an accessing apparatus which is to access a storage device sends an authentication identifier encrypted using a key associated with the request source of the access, and then a control apparatus, when receiving the access, determines based on the authentication identifier received from the accessing apparatus whether to permit the access to data stored in the storage device.

On the other hand, one example for controlling a transmission path in a storage system is that, when a switching node which has stored therein bandwidth control parameters receives an access request for accessing a storage device, establishes a path of optimal bandwidth on a relay network by using bandwidth control parameters appropriate for the request. Another example is that each router adds the identification information of the own device to path vector Type-Length-Value (TLV) information which propagates through a network, and transfers the resultant to an adjacent router, so that each router detects paths from the path vector TLV information, and if a node fails in the network, determines an optimal path from the paths detected from the path vector TLV information.

Please refer to Japanese Laid-open Patent Publications Nos. 2004-362600, 2002-529804, 2004-56728, and 2007-67690.

The above login process using the FIP is performed under a precondition that an ENode communicates with a single FCoE switch. Therefore, if the ENode is connected to a plurality of FCoE switches, the ENode has difficulty in determining which FCoE switch to connect with for the login process.

SUMMARY

According to one embodiment, a communication control apparatus for controlling data communication between a first network and a second network includes: a first receiving unit that receives a first packet sent from an access requesting apparatus over the first network, and upon determining that an access requested apparatus recognized from the received first packet exists in the second network, registering first identification information included in the received first packet in a storage unit, the first packet being generated so as to include the first identification information identifying the access requesting apparatus and to enable an apparatus which receives the first packet over the first network to recognize the access requested apparatus; and a second receiving unit that receives a second packet including the first identification information over the first network, and upon determining that the first identification information included in the received second packet is registered in the storage unit, sends second identification information identifying the own communication control apparatus to the access requesting apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates example information registered in a connected device list;

DESCRIPTION OF EMBODIMENTS

Figure 1:
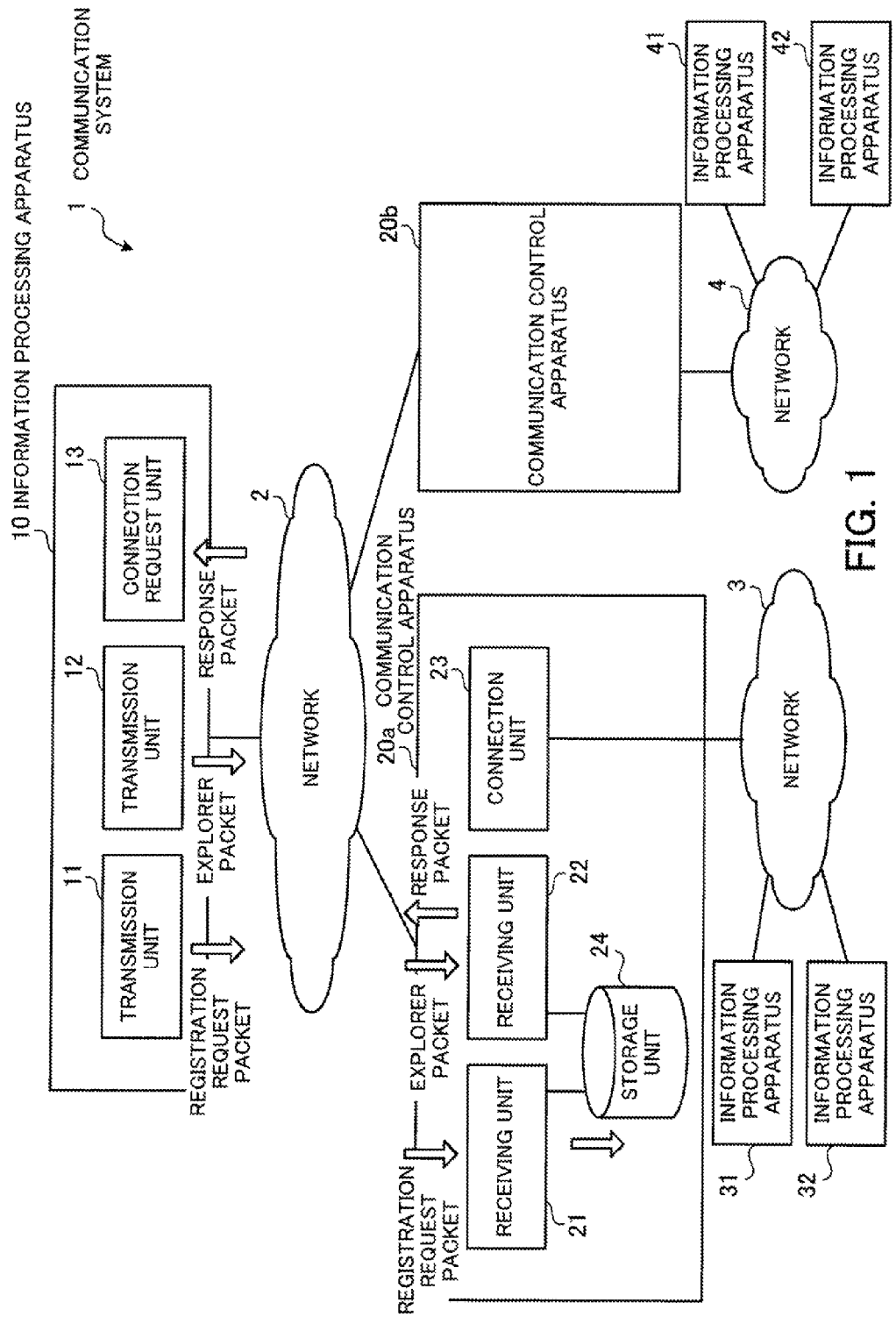
FIG. 1 illustrates an example configuration of a communication system according to a first embodiment.

Embodiments of the present invention will now be described with reference to the accompanying drawings, wherein like reference numerals refer to like elements throughout.

(First Embodiment)

FIG. 1 illustrates an example configuration of a communication system according to a first embodiment.

The illustrated communication system 1 includes an information processing apparatus 10 and a plurality of communication control apparatuses. These information processing apparatus 10 and communication control apparatuses are connected to each other over a network 2. Each communication control apparatus controls data communication between the network 2 and another network. As an example, the illustrated communication system 1 includes two communication control apparatuses 20a and 20b. The communication control apparatus 20a is also connected to a network 3, so as to control data communication between the networks 2 and 3. The communication control apparatus 2b is also connected to a network 4, so as to control data communication between the networks 2 and 4.

In addition to the communication control apparatus 20a, a plurality of apparatuses including information processing apparatuses 31 and 32 is connected to the network 3. Similarly, in addition to the communication control apparatus 20b, a plurality of apparatuses including information processing apparatuses 41 and 42 is connected to the network 4. For example, the networks 3 and 4 use different protocols from the network 2.

Assume now that, when the information processing apparatus 10 accesses an apparatus (hereinafter, referred to as an access requested apparatus) existing in another network via a communication control apparatus, this information processing apparatus 10 first searches for the communication control apparatus by using an explorer packet. This explorer packet is sent, for example, by multicast, to all communication control apparatuses connected to the network 2.

When the information processing apparatus 10 sends the explorer packet over the network 2, a communication control apparatus receives the explorer packet, and sends a response packet including identification information identifying the own communication control apparatus to the information processing apparatus 10, which is an access requesting apparatus. Upon receipt of the response packet, the information processing apparatus 10 extracts the identification information of the communication control apparatus from the response packet, and connects with the communication control apparatus identified by the extracted identification information, thereby making it possible to access the access requested apparatus via the connected communication control apparatus.

In this connection, the explorer packet is a packet for searching for a communication control apparatus which controls data communication between the network 2 and another network, and is not a packet for searching for a specified communication control apparatus connected to a network to which an access requested apparatus belongs. For example, the explorer packet includes identification information identifying the access requesting apparatus, but does not include information identifying the access requested apparatus or the network to which the access requested apparatus belongs. Therefore, in the case where a plurality of communication control apparatuses is connected to the network 2, all communication control apparatuses which receive the explorer packet send response packets to the information processing apparatus 10. Thereby, the information processing apparatus 10 receives the plurality of response packets, which results in failing to select a communication control apparatus to connect with, from among the communication control apparatuses which have sent the response packets.

By contrast, in the communication system 1 according to this embodiment, the information processing apparatus 10 sends a registration request packet over the network 2 before sending such an explorer packet. The registration request packet is generated so as to enable a receiving-side communication control apparatus to recognize an access requested apparatus. By sending such a registration request packet and then sending the explorer packet, only a communication control apparatus connected to a network to which the access requested apparatus belongs is caused to send a response packet.

The information processing apparatus 10 is provided with transmission units 11 and 12 and a connection request unit 13 as processing functions for accessing an access requested apparatus. On the other hand, the communication control apparatus 20a is provided with receiving units 21 and 22 and a connection unit 23 as processing functions for responding to packets received from the information processing apparatus 10. While not illustrated in FIG. 1, the communication control apparatus 20b has the identical processing functions to the communication control apparatus 20a.

The following describes how the information processing apparatus 10 and communication control apparatuses 20a and 20b operate, for example, when the information processing apparatus 10 accesses the information processing apparatus 31 existing in the network 3.

The transmission unit 11 of the information processing apparatus 10 sends a first packet over the network 2. This first packet corresponds to the above-described registration request packet, and includes the identification information of the own apparatus to request registration of this identification information. The transmission unit 11 generates such a registration request packet so as to enable a receiving-side apparatus to recognize an access requested apparatus. For example, the transmission unit 11 may include identification information identifying the access requested apparatus in the registration request packet. Alternatively, the transmission unit 11 may encrypt information (for example, identification information of the information processing apparatus 10) to be stored in the registration request packet, by using the identification information identifying the access requested apparatus. Not an information processing apparatus 31 and 32 on the network 3 but the communication control apparatus 20a may be set as the access requested apparatus.

The registration request packet is sent to all communication control apparatuses connected to the network 2. For example, the registration request packet is successively transferred from an apparatus to its adjacent apparatuses on the network 2. Upon receipt of the registration request packet over the network 2, the receiving unit 21 of the communication control apparatus 20a recognizes an access requested apparatus from the received registration request packet.

Assume now that the communication control apparatus 20a is able to recognize apparatuses connected to the network 3. For example, the communication control apparatus 20a recognizes the apparatuses connected to the network 3 from an apparatus list having registered therein the identification information of the apparatuses connected to the network 3. The apparatus list is stored in a storage unit 24 connected to the communication control apparatus 20*a*, for example. When the communication control apparatus 20*a* boots up or when an apparatus newly connects with the network 3 while the communication control apparatus 20*a* is active, the communication control apparatus 20*a* registers the identification information of the apparatus(es) connected to the network 3 in the apparatus list. Similarly, the communication control apparatus 20*b* is designed to be able to recognize apparatuses connected to the network 4.

The receiving unit 21 determines whether or not the access requested apparatus recognized from the received registration request packet exists in the network 3. If the access requested apparatus is determined to exist in the network 3, the receiving unit 21 registers the identification information of the access requesting apparatus (that is, information processing apparatus 10) included in the received registration request packet, in the storage unit 24. The identification information of the access requesting apparatus and the apparatus list may be stored in different storage units.

If the access requested apparatus is determined not to exist in the network 3, the receiving unit 21 transfers the received registration request packet to an adjacent communication control apparatus existing in the network 2. In this connection, if a plurality of communication control apparatuses is connected to the communication control apparatus 20*a*, the receiving unit 21 transfers the registration request packet to all of these communication control apparatuses. If the communication control apparatus 20*a* receives the registration request packet from one of a plurality of communication control apparatuses connected thereto, the receiving unit 21 transfers the registration request packet to all communication control apparatuses except the one from which the registration request packet came. Through this transfer, the registration request packet originally sent from the information processing apparatus 10 is successively transferred between communication control apparatuses existing in the network 2 until a communication control apparatus connected to the network to which the access requested apparatus belongs receives the registration request packet.

In the information processing apparatus 10, the transmission unit 12 sends a second packet over the network 2 after the transmission unit 11 sends the registration request packet. This second packet corresponds to the above-described explorer packet, and includes the identification information identifying the access requesting apparatus, i.e., the information processing apparatus 10. The explorer packet is sent by multicast to all communication control apparatuses existing in the network 2.

Upon receipt of the explorer packet over the network 2, the receiving unit 22 of the communication control apparatus 20*a* determines whether or not the identification information of the access requesting apparatus included in the received explorer packet has been registered in the storage unit 24. If the identification information is found in the storage unit 24, the receiving unit 22 sends a response packet including the identification information of the own apparatus to the information processing apparatus 10 that originally sent the explorer packet.

If the identification information of the access requesting apparatus is not found in the storage unit 24, the receiving unit 22 does not send a response packet. For example, in response to the explorer packet received, a receiving unit 22 (not illustrated) provided in the communication control apparatus 20*b* does not send a response packet because the access requested apparatus does not exist in the network 4 connected to the own apparatus.

The information processing apparatus 10 receives a response packet only from the communication control apparatus 20*a* out of the communication control apparatuses connected to the network 2. By connecting with the communication control apparatus 20*a* identified by the identification information included in the response packet, the information processing apparatus 10 becomes able to access the information processing apparatus 31 which is the access requested apparatus. More specifically, the connection request unit 13 of the information processing apparatus 10 requests the communication control apparatus 20*a* for connection to the network 3. The connection unit 23 of the communication control apparatus 20*a* permits the connection to the network 3 in response to the connection request received from the connection request unit 13 of the information processing apparatus 10. Thereby, the information processing apparatus 10 becomes able to access the information processing apparatus 31 existing in the network 3.

In the above approach, out of the communication control apparatuses which receive a registration request packet, only a communication control apparatus connected to a same network as an access requested apparatus recognized from the registration request packet registers the identification information of the access requesting apparatus in a storage unit. When an explorer packet is sent after that, only the communication control apparatus, which has registered the identification information of the access requesting apparatus, sends a response packet in response to the explorer packet. Therefore, even in the case where a plurality of communication control apparatuses is connected to the network 2, the information processing apparatus 10 is able to search for and connect with a communication control apparatus connected to the same network as the access requested apparatus.

In addition, the above approach allows a plurality of communication control apparatuses to be connected to the network 2 in the communication system 1, which gives more relaxed constraints and scalability to network configuration.

The following describes an embodiment in which an FCoE storage system is employed as the above-described communication system 1.

(Second Embodiment)

Figure 2:
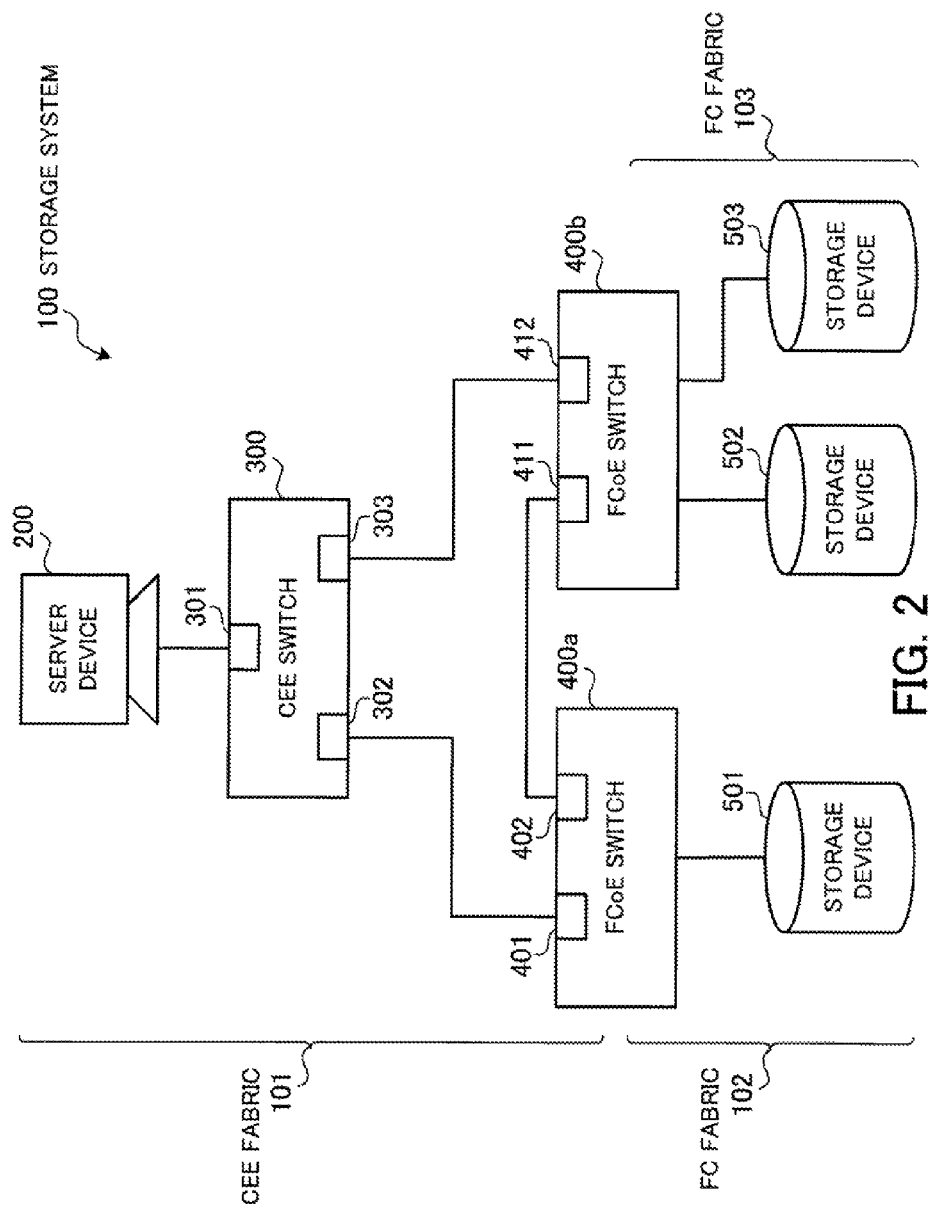
FIG. 2 illustrates an example configuration of a storage system according to a second embodiment.

FIG. 2 illustrates an example configuration of a storage system according to a second embodiment. The illustrated storage system 100 includes a server device 200, Converged Enhanced Ethernet (CEE) switch 300, FCoE switches 400*a* and 400*b*, and storage devices 501 to 503.

The server device 200, CEE switch 300, and FCoE switches 400*a* and 400*b* belong to a CEE fabric 101 which is a network based on the CEE standards. In addition, a Local Area Network (LAN) cable which provides a transfer rate of 1 Gbps (Giga Bits Per Second) or more is used to connect between the server device 200 and CEE switch 300, between the CEE switch 300 and each FCoE switch 400*a* and 400*b*, and between the FCoE switches 400*a* and 400*b*.

Assume now that the devices belonging to the CEE fabric 101 are connected one-to-one by different LAN cables. For example, the CEE switch 300 connects with the server device 200 and FCoE switches 400*a* and 400*b* via the LAN ports 301, 302, and 303, respectively. The FCoE switch 400*a* connects with the CEE switch 300 and FCoE switch 400*b* via the LAN ports 401 and 402, respectively. The FCoE switch 400*b* connects with the FCoE switch 400*a* and the CEE switch 300 via the LAN ports 411 and 412, respectively.

On the other hand, FC cables are used to connect between the FCoE switch 400a and a storage device 501 and between the FCoE switch 400b and each storage device 502 and 503. The FCoE switch 400a and storage device 501 belong to an FC fabric 102, and the FCoE switch 400b and storage devices 502 and 503 belong to an FC fabric 103. The FC fabrics 102 and 103 are networks based on the FC standards.

In this storage system 100, the server device 200 accesses a device connected to either one of the FC fabrics 102 and 103. The CEE switch 300 relays data between devices connected to the CEE fabric 101 according to the CEE standards. The FCoE switch 400a relays data between devices connected to the CEE fabric 101 according to the CEE standards, and also relays data between the CEE fabric 101 and FC fabric 102 according to the FCoE standards. The FCoE switch 400b relays data between devices connected to the CEE fabric 101 according to the CEE standards, and also relays data between the CEE fabric 101 and the FC fabric 103 according to the FCoE standards.

The storage devices 501 to 503 are devices that read and write data on various storage media. Each storage device 501 to 503 may be a disk array device provided with a plurality of Hard Disk Drives (HDD) or Solid State Drives (SDD), or a tape library device provided with magnetic tape drive devices and tape cartridge carry mechanism.

Referring to the example of FIG. 2, two FCoE switches 400a and 400b are connected to the CEE fabric 101. However, three or more FCoE switches may be connected to the CEE fabric 101. Further, two or more storage devices or various information processing apparatuses other than storage devices may be connected to the FC fabric 102. Similarly, three or more storage devices or various information processing apparatuses other than storage devices may be connected to the FC fabric 103.

Figure 3:
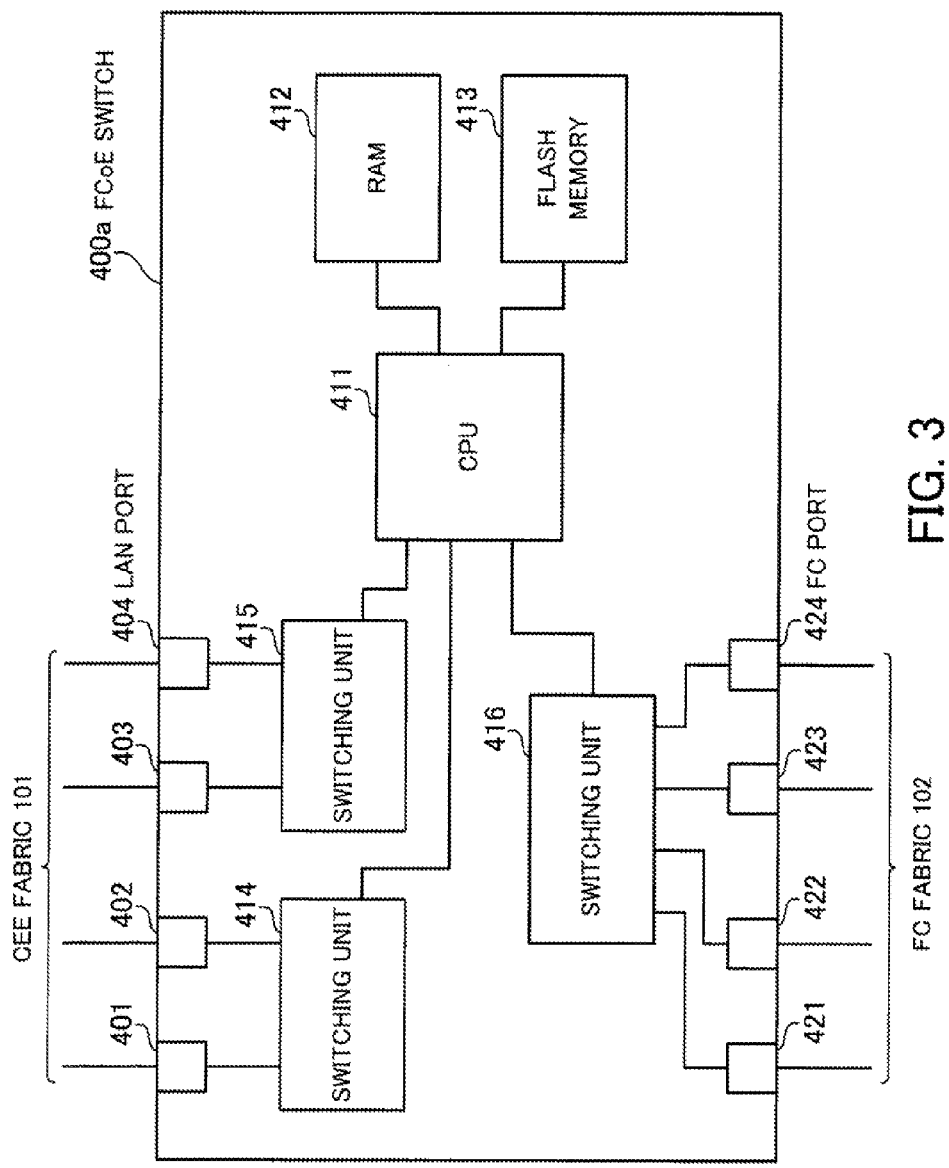
FIG. 3 illustrates an example hardware configuration of an FCoE switch.

FIG. 3 illustrates an example hardware configuration of an FCoE switch. In FIG. 3, the hardware configuration of the FCoE switch 400a is illustrated by way of example because the FCoE switches 400a and 400b have the identical configuration.

The FCoE switch 400a includes a Central Processing Unit (CPU) 411, Random Access Memory (RAM) 412, Flash memory 413, switching units 414 to 416, LAN ports 401 to 404, and FC ports 421 to 424.

The CPU 411 entirely controls the FCoE switch 400a. In addition, the CPU 411 controls a data relay operation of each switching unit 414 to 416 and a data relay operation performed between the switching units 414 to 416.

The RAM 412 temporarily stores at least part of firmware to be executed by the CPU 411, and also stores various data to be used for CPU processing.

The flash memory 413 stores the firmware to be executed by the CPU 411 and various data to be used in executing the firmware. Instead of the flash memory 413, another kind of non-volatile storage device, such as HDD, may be used.

The switching units 414 and 415 perform switching of data to be transferred between devices connected to the CEE fabric 101, under the control of the CPU 411. The switching units 414 and 415 are realized as separate semiconductor integrated circuits, for example. The LAN ports 401 and 402 are connected to the switching unit 414, whereas the LAN ports 403 and 404 are connected to the switching unit 415. Data to be transferred between LAN ports connected to different switching units, such as between the LAN ports 401 and 403, is switched via the CPU 411.

The switching unit 416 performs switching of data to be transferred between devices connected to the FC fabric 102, under the control of the CPU 411.

Further, data is relayed between the CEE fabric 101 and the FC fabric 102 via the CPU 411.

In this connection, the CEE switch 300 may be realized, for example, by the identical hardware components to those provided in the FCoE switch 400a illustrated in FIG. 3 except the switching unit 416 and FC ports 421 to 424.

Figure 4:
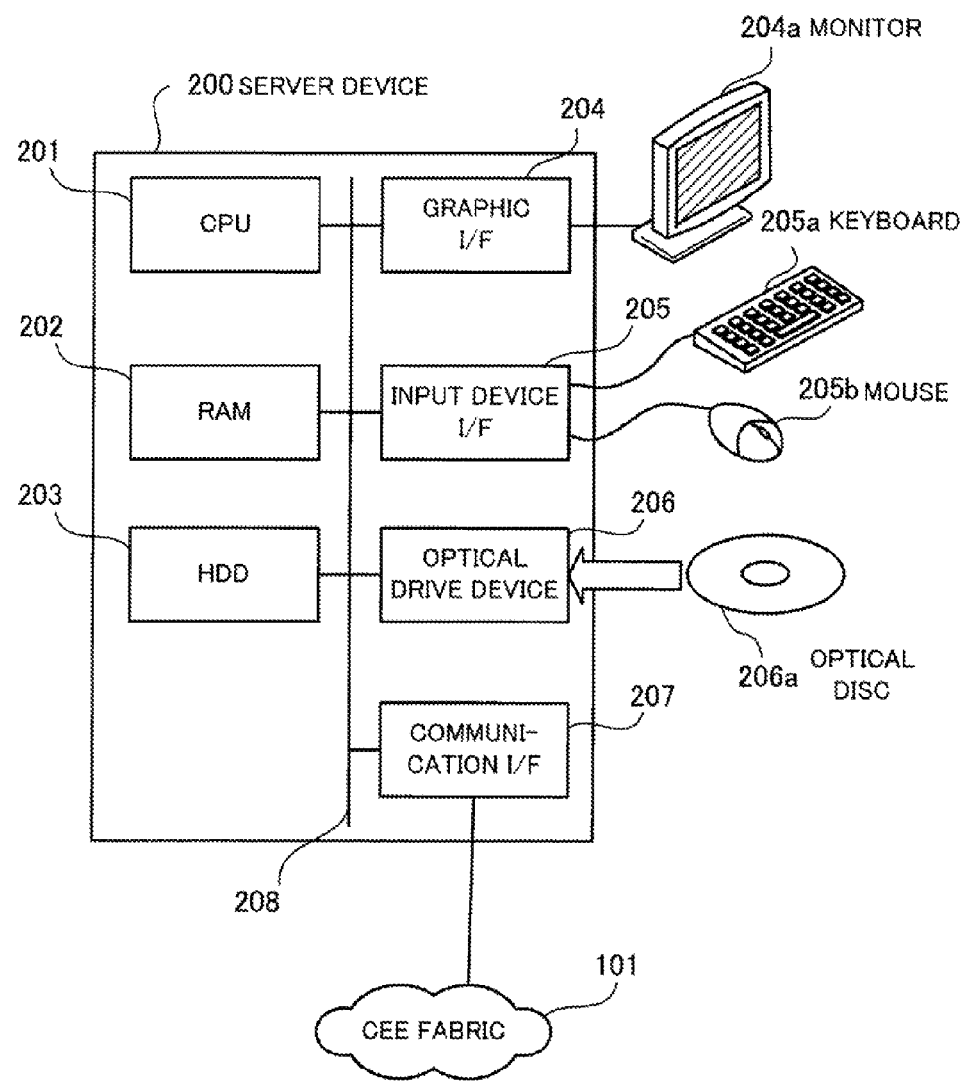
FIG. 4 illustrates an example hardware configuration of a server device.

FIG. 4 illustrates an example hardware configuration of a server device.

The server device 200 is realized as a computer illustrated in FIG. 4, for example. The server device 200 is entirely controlled by a CPU 201. To the CPU 201, a RAM 202 and a plurality of peripheral units are connected via a bus 208.

The RAM 202 is used as a main memory of the server device 200, and temporarily stores part of Operating System (OS) programs and application programs to be executed by the CPU 201, and various data to be used for CPU processing.

The peripheral units connected with the bus 208 include an HDD 203, a graphic interface (I/F) 204, an input device I/F 205, an optical drive device 206, and a communication I/F 207.

The HDD 203 magnetically reads and writes data on a built-in magnetic disk. The HDD 203 is used as a secondary memory of the server device 200, and stores the OS programs, application programs, and various data. As a secondary memory, a semiconductor memory device such as a flash memory may be used.

To the graphic I/F 204, a monitor 204a is connected. The graphic I/F 204 displays an image on the monitor 204a in accordance with an instruction from the CPU 201. As the monitor 204a, a Liquid Crystal Display (LCD) may be used, for example.

To the input device I/F 205, a keyboard 205a and mouse 205b are connected. The input device I/F 205 transfers signals from the keyboard 205a and mouse 205b to the CPU 201. In this connection, the mouse 205b is one type of pointing devices, and another pointing device, such as a touch panel, tablet, touchpad, or trackball, may be used instead.

The optical drive device 206 reads data from an optical disc 206a with a laser beam. The optical disc 206a is a portable recording medium on which data is recorded so as to be read using reflected light. Such optical discs 206a include Digital Versatile Discs (DVD), DVD-RAMS, Compact Disc Read Only Memories (CD-ROM), and CD-Recordable (CD-R)/ReWrittable (RW).

The communication I/F 207 communicates data with another device connected to the CEE fabric 101.

The following describes the case where the server device 200 accesses a device connected to either one of the FC fabrics 102 and 103.

According to the FCoE standards, an ENode which is a host device connected to a CEE fabric needs to log in to an FCoE switch connected to an FC fabric when connecting to the FC fabric. This login process is defined by the FIP. According to the FIP, the ENode sends an explorer packet by multicast over the CEE fabric to search for an FCoE switch, and acquires the MAC address of the FCoE switch to be logged in, from a response packet received as a response to the explorer packet.

However, this search for the FCoE switch under the FIP does not cover the case where a plurality of FCoE switches connected to respective ones of a plurality of FC fabrics is connected on the CEE fabric. If an explorer packet is sent by multicast to a plurality of FCoE switches existing in the CEE fabric, all of the FCoE switches which receive the explorer packet make a response. As a result, the ENode has difficulty in determining which FCoE switch to log in to, out of the FCoE switches which have responded to the explorer packet.

To deal with this problem, in the storage system 100 according to this embodiment, an ENode sends a control packet to all FCoE switches before searching for an FCoE switch under the FIP. This control packet is a packet for allowing only one FCoE switch to respond to an explorer packet, and requesting this FCoE switch to register the identification information of the ENode. The control packet corresponds to the registration request packet described with reference to FIG. 1.

In this embodiment, this control packet is a packet based on Data Center Bridge eXchange Protocol (DCBX) which is a protocol for exchanging unique parameters on a CEE fabric. Hereinafter, this control packet is simply referred to as "DCBX packet".

A DCBX packet includes, as TLV information, a World Wide Name (WWN) identifying an ENode which originates this DCBX packet and path determination conditions for enabling an FCoE switch to determine an optimal communication path for receiving a login request.

In the DCBX packet, these WWN of the ENode and path determination conditions are encrypted with a WWN identifying a device on the FC fabric to be accessed by the ENode. The DCBX packet is transferred from a CEE switch or FCoE switch to its adjacent CEE switches or FCoE switches on the CEE fabric until the DCBX packet is received by an FCoE switch which is able to decrypt the encrypted TLV information. Therefore, the DCBX packet is sent to all FCoE switches on the CEE fabric. If there is a plurality of transmission paths from the ENode to an FCoE switch, the DCBX packet is sent to the FCoE switch through all of the transmission paths.

The FCoE switch which is able to decrypt the encrypted TLV information is an FCoE switch that is connected to an FC fabric to which an access requested device to be accessed by the ENode belongs. The FCoE switch manages the WWNs of devices connected to the FC fabric connected to the own device, in a connected device list to be described later. Since the TLV information is encrypted with the WWN of the access requested device, the FCoE switch determines that the access requested device belongs to the FC fabric connected to the own device only when it is able to decrypt the TLV information of the received DCBX packet with a WWN registered in the connected device list. In addition, the encrypted TLV information keeps the WWN of the Enode and path determination conditions confidential from devices on the CEE fabric which are not requested to perform a login process.

Figure 5:
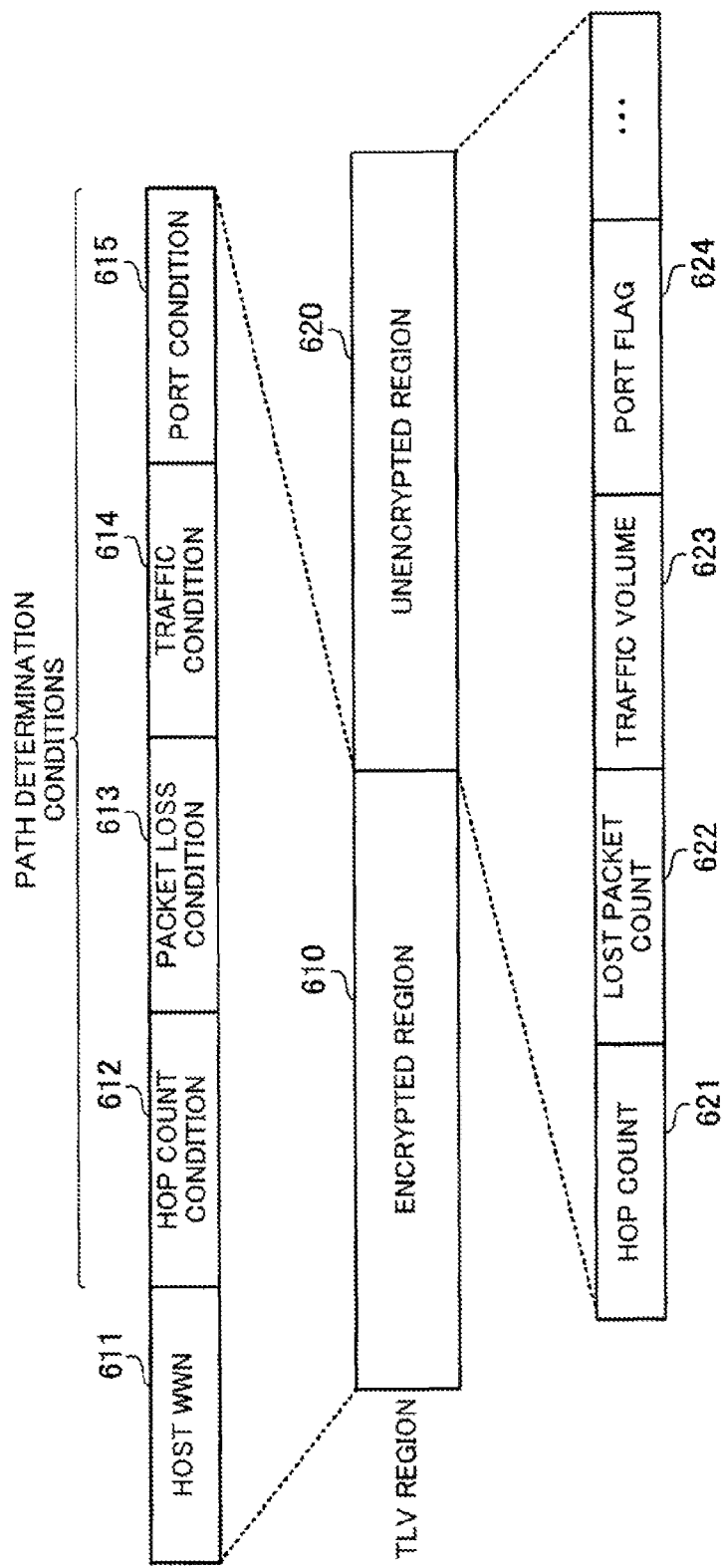
FIG. 5 illustrates example TLV information stored in a DCBX packet.

FIG. 5 illustrates example TLV information stored in a DCBX packet.

A TLV region for storing TLV information in a DCBX packet includes an encrypted region 610 and an unencrypted region 620. The encrypted region 610 stores a host WWN 661 that indicates the WWN of an ENode and the above-mentioned path determination conditions, which are encrypted with the WWN of an access requested device.

In this connection, an FCoE switch may be set as an access requested device. For example, in FIG. 2, the server device 200 is able to set the FCoE switch 400a, not the storage device 501, as an access requested device on the FC fabric 102.

The path determination conditions include a hop count condition 612, packet loss condition 613, traffic condition 614, and port condition 615.

The hop count condition 612 indicates a maximum value of the number of switches (CEE switch and/or FCoE switch) existing on a communication path from an ENode to an FCoE switch. If an FCoE switch determines that the number of switches existing on a communication path between a LAN port of the own device to an ENode exceeds the value set as the hop count condition 612, the FCoE switch does not use this LAN port for a login process of the ENode.

For example, referring to FIG. 2, assume that a DCBX packet sent from the server device 200 is input to the LAN port 402 of the FCoE switch 400a via the CEE switch 300 and FCoE switch 400b. In this case, the number of switches on this communication path is 2. If the hop count condition 612 has a value of "1", the FCoE switch 400a determines that this hop count condition 612 is not satisfied, and does not use the LAN port 402 for the login process of the server device 200.

The packet loss condition 613 indicates a maximum value of the number of lost packets in switches existing on a communication path from an ENode to an FCoE switch. If an FCoE switch determines that the number of lost packets detected by the switches existing on a communication path between a LAN port of the own device and an ENode exceeds the value set as the packet loss condition 613, the FCoE switch does not use this LAN port for the login process of the ENode.

Alternatively, a maximum value of the number of lost packets in a switch existing on a communication path may be set as the packet loss condition 613. In this case, if an FCoE switch determines that the highest number of lost packets in the switches existing on the communication path between a LAN port of the own device and the ENode exceeds the value set as the packet loss condition 613, the FCoE switch does not use this LAN port for the login process of the ENode.

The traffic condition 614 indicates a maximum average value of traffic volume in switches existing on a communication path from an ENode to an FCoE switch. An FCoE switch calculates an average traffic volume of the switches existing on a communication path from a LAN port of the own device to an ENode, and if the calculated average volume exceeds the value set as the traffic condition 614, the FCoE switch does not use this LAN port for the login process of the ENode.

Alternatively, a maximum value of traffic volume in a switch existing on a communication path may be set as the traffic condition 614. In this case, if an FCoE switch determines that the most traffic volume in the switches existing on a communication path between a LAN port of the own device and an ENode exceeds the value set as the traffic condition 614, the FCoE switch does not use this LAN port for the login process of the ENode.

The port condition 615 indicates whether to allow each switch existing on a communication path between an ENode to an FCoE switch to transfer packets between LAN ports belonging to different port groups. A port group consists of LAN ports connected to a switching unit realized by a single semiconductor integrated circuit. For example, referring to FIG. 3, the LAN ports 401 and 402 connected to the switching unit 414 belong to the same port group, whereas the LAN ports 403 and 404 connected to the switching unit 415 belong to a different port group from the LAN ports 401 and 402.

In the case where the port condition 615 indicates that packet transfer between LAN ports belonging to different port groups is not allowed, an FCoE switch, if detecting that at least one switch existing on a communication path between a LAN port of the own device and the ENode made a packet transfer between LAN ports of different port groups, does not use this LAN port for the login process of the ENode.

On the other hand, the unencrypted region 620 stores information to be checked when an FCoE switch determines whether path determination conditions are satisfied or not. The information in the unencrypted region 620 is updated every time a DCBX packet passes through a switch, so that information indicating a communication state of each of the switches that the DCBX packet passed through is collected.

The unencrypted region 620 stores a hop count 621, a lost packet count 622, a traffic volume 623, and a port flag 624.

The hop count 621 indicates the number of switches a DCBX packet passed through. The hop count 621 has an initial value of "0" at the time a DCBX packet is sent from an ENode. After that, the value of the hop count is incremented by "1" every time the DCBX packet passes through a switch.

The lost packet count 622, traffic volume 623, and port flag 624 are added to the unencrypted region 620 every time a DCBX packet passes through a switch. Therefore, the unencrypted region 620 stores as many lost packet counts 622, traffic volumes 623, and port flags 624 as the number of switches the DCBX packet passed through.

The lost packet count 622 indicates the number of lost packets detected by a LAN port which received the DCBX packet. The traffic volume 623 indicates an amount of data received within a predetermined time period by a LAN port which received the DCBX packet. The port flag 624 indicates whether or not the DCBX packet was transferred between LAN ports belonging to the same port group of a switch. A port flag 624 of "0" indicates that the DCBX packet was transferred between LAN ports belonging to the same port group. A port flag 624 of "1" indicates that the DCBX packet was transferred between LAN ports belonging to different port groups.

Figure 6:
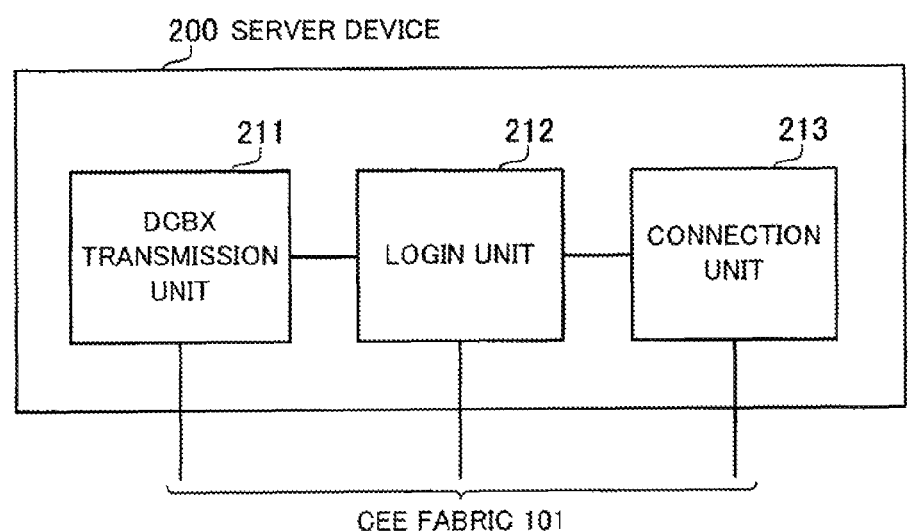
FIG. 6 illustrates an example configuration of processing functions of the server device.

FIG. 6 illustrates an example configuration of processing functions of a server device.

The server device 200 includes a DCBX transmission unit 211, a login unit 212, and a connection unit 213. The processes of these processing blocks are realized by the CPU 201 of the server device 200 executing a predetermined program. Alternatively, part or all of the processes of these processing blocks may be realized by the communication I/F 207 of the server device 200.

The DCBX transmission unit 211 sends a DCBX packet described above, to adjacent devices on the CEE fabric 101. Referring to the example system configuration of FIG. 2, the DCBX transmission unit 211 sends a DCBX packet to the CEE switch 300.

The login unit 212 performs a process of logging in to an FCoE switch connected to an FC fabric to which an access requested device belongs, in accordance with the FIP after the DCBX transmission unit 211 sends the DCBX packet. The login unit 212 first sends an explorer packet by multicast over the CEE fabric 101 to search for an FCoE switch. The login unit 212 then receives a response packet as a response to the explorer packet from one FCoE switch, and sends a login request packet to the FCoE switch which has sent the response packet. Upon receipt of a response packet to the login request packet, the login unit 212 extracts the MAC address to be used for FCoE communication, from the received packet, and then completes this login process.

The connection unit 213 connects with the FCoE switch which has responded to the explorer packet, by using the MAC address for FCoE communication extracted by the login unit 212, and then connects with the access requested device via this FCoE switch. The connection unit 213 communicates data in accordance with the FC standards by transmitting and receiving Ethernet frames in which predetermined information in FC frames is encapsulated, to/from the FCoE switch.

Figure 7:
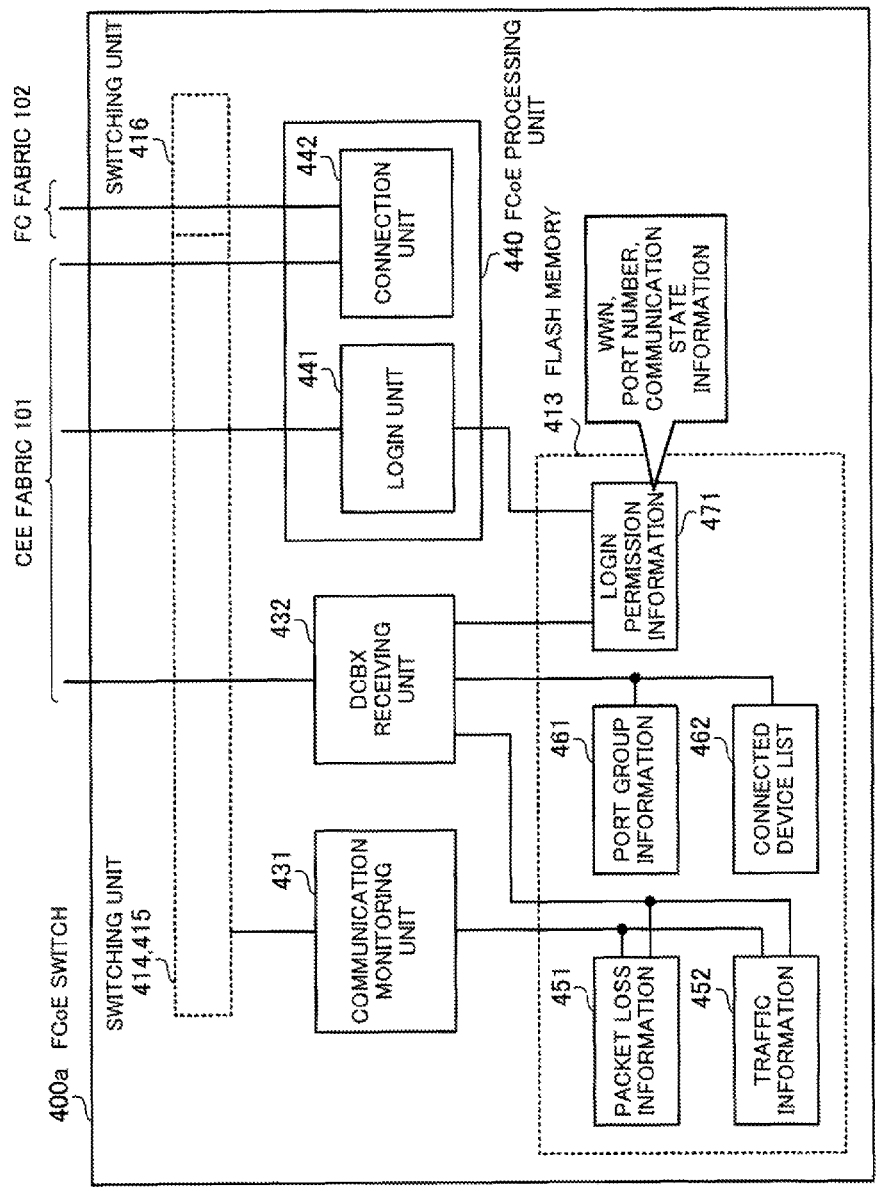
FIG. 7 illustrates an example configuration of processing functions of the FCoE switch.

FIG. 7 illustrates an example configuration of the processing functions of an FCoE switch. Only the FCoE switch 400a will be described with reference to FIG. 7 by way of example as the FCoE switches 400a and 400b have the identical processing functions.

The FCoE switch 400a includes a communication monitoring unit 431, a DCBX receiving unit 432, and an FCoE processing unit 440. The processes of these processing blocks are realized by a CPU 411 of the FCoE switch 400a executing a predetermined firmware. Alternatively, part or all of these processes may be realized by dedicated hardware circuits.

The communication monitoring unit 431 monitors the communication states of the switching units 414 and 415. More specifically, the communication monitoring unit 431 detects the number of lost packets in each LAN port 401 to 404, and registers the detected number of lost packets as packet loss information 451 for each LAN port in the flash memory 413. The communication monitoring unit 431 updates the packet loss information 451 every time it detects a packet loss. In addition, the communication monitoring unit 431 detects an amount of data transmitted/received within a predetermined time period by each LAN port 401 to 404, and registers the detected amount of transmitted/received data as traffic information 452 for each LAN port for the time period in the flash memory 413.

The DCBX receiving unit 432 consults the packet loss information 451, traffic information 452, and port group information 461 stored in the flash memory 413 and the connected device list 462 to perform a process of responding to a DCBX packet received over the CEE fabric 101.

The port group information 461 holds the port numbers of LAN ports connected to a same switching unit, in association with the port group number unique to the switching unit. The connected device list 462 contains information on devices connected to the FC fabric 102.

FIG. 8 illustrates example information registered in a connected device list.

As illustrated in FIG. 8, registered in the connected device list 462 are the WWN of each device connected to the FC fabric 102 and the port number of an FC port of the FCoE switch 400a connected to the device, in association with the device type of the device. Information on the own FCoE switch 400a may be registered in this connected device list 462.

In this connection, the connected device list 462 is managed by a name server function, not illustrated, provided in the FCoE switch 400a. The name server function updates the connected device list 462 when a new device is connected to the FC fabric 102 and when a communication with a device on the FC fabric 102 is disconnected.

Referring back to FIG. 7.

Upon receipt of the DCBX packet, the DCBX receiving unit 432 decrypts the encrypted region 610 of the received DCBX packet with a WWN registered in the connected device list 462 as a decryption key. If the DCBX receiving unit 432 fails to decrypt the encrypted region 610, the DCBX receiving unit 432 transfers the DCBX packet to adjacent devices on the CEE fabric 101 except a device from which the DCBX packet came. For example, if a DCBX packet is received via the LAN port 401, the DCBX receiving unit 432 transfers the DCBX packet to the adjacent FCoE switch 400b via the LAN port 402. In addition, when transferring the DCBX packet, the DCBX receiving unit 432 updates the unencrypted region 620 of the DCBX packet on the basis of information registered as the packet loss information 451, traffic information 452, and port group information 461.

If the DCBX receiving unit 432 succeeds in decrypting the encrypted region 610 of the DCBX packet, it extracts the path determination conditions from the decrypted encrypted region 610, and determines the information stored in the unencrypted region 620 of the DCBX packet satisfies the extracted path determination conditions. If the path determination conditions are satisfied, the DCBX receiving unit 432 registers the host WWN 661 extracted from the encrypted region 610 of the DCBX packet and the port number of the LAN port which received this DCBX packet, in the flash memory 413 as login permission information 471. The DCBX receiving unit 432 also stores the communication state information collected from the DCBX packet as this login permission information 471. This login permission information 471 may be recorded in the RAM 412 of the FCoE switch 400*a*, for example. If the path determination conditions are not satisfied, on the contrary, the DCBX receiving unit 432 discards this received DCBX packet.

The FCoE processing unit 440 includes a login unit 441 and a connection unit 442. The login unit 441 executes a login process of an ENode in accordance with the FIP. More specifically, when receiving an explorer packet via the LAN port corresponding to a port number registered in the login permission information 471, the login unit 441 determines whether or not the WWN of the ENode stored in the received explorer packet has been registered in the login permission information 471, and if the WWN is found, the login unit 441 sends a response packet to the ENode. Then, the login unit 441 receives a login request from the ENode, which is a destination of the response packet, and gives a MAC address for FCoE communication to the ENode.

The connection unit 442 receives a connection request from the ENode given the MAC address for FCoE communication by the login unit 441, and establishes a connection between the ENode and the access requested device on the FC fabric 102. Then, the connection unit 442 relays data between the ENode and the access requested device which have the established connection.

Figure 9:
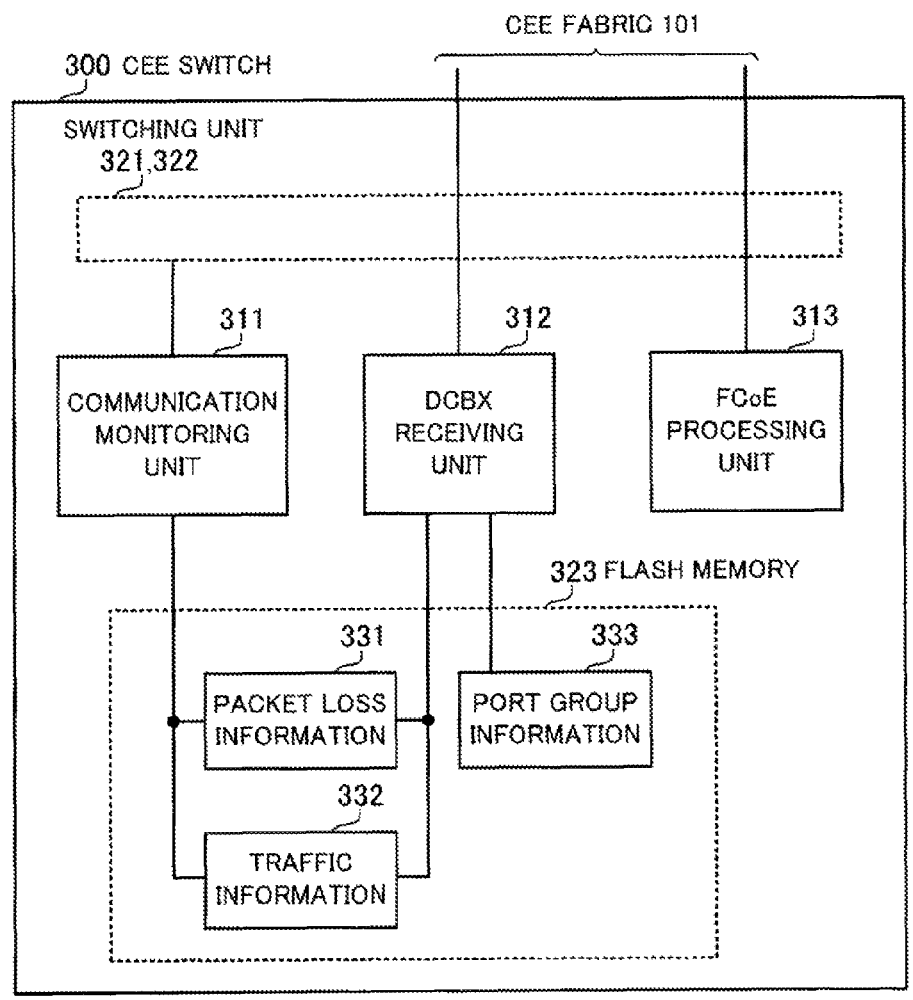
FIG. 9 illustrates an example configuration of processing functions of a CEE switch.

FIG. 9 illustrates an example configuration of processing functions of a CEE switch.

The CEE switch 300 has a communication monitoring unit 311, DCBX receiving unit 312, and FCoE processing unit 313. The processes of these processing blocks are realized by a CPU of the CEE switch 300 executing a predetermined firmware, for example. Alternatively, part or all of the processes of the processing blocks may be realized by dedicated hardware circuits.

In this connection, the CEE switch 300 has switching units 321 and 322 and a flash memory 323, as example hardware components other than the CPU. The switching units 321 and 322 are separate semiconductor integrated circuits and perform switching between LAN ports connected thereto, similarly to the switching units 414 and 415 of the FCoE switch 400*a*.

The communication monitoring unit 311 monitors the communication states of the switching units 321 and 322. The communication monitoring unit 311 operates in the same way as the communication monitoring unit 431 of the FCoE switch 400*a*. That is, the communication monitoring unit 311 detects the number of lost packets in each LAN port connected to the switching units 321 and 322, and registers the detected number of lost packets as packet loss information 331 for each LAN port in the flash memory 323. The communication monitoring unit 311 updates the packet loss information 331 every time a packet loss is detected. In addition, the communication monitoring unit 311 detects an amount of data received within a predetermined time period by each LAN port connected to the switching units 321 and 322, and registers the detected amount of received data as traffic information 332 for each LAN port for the time period in the flash memory 323.

The DCBX receiving unit 312 transfers the DCBX packet received over the CEE fabric 101 to adjacent devices on the CEE fabric 101 except a device from which the DCBX packet came. When transferring the DCBX packet, the DCBX receiving unit 312 updates the unencrypted region 620 of the DCBX packet on the basis of the packet loss information 331, traffic information 332, and port group information 333 stored in the flash memory 323. The DCBX receiving unit 312 transfers the DCBX packet as in the case where the DCBX receiving unit 432 of the FCoE switch 400*a* transfers a DCBX packet. In addition, the port group information 333 holds the port numbers of LAN ports connected to a same switching unit in association with the port group number unique to the switching unit, similarly to the port group information 461 of the FCoE switch 400*a*.

After the ENode sends the DCBX packet, the FCoE processing unit 313 relays an explorer packet which is sent by multicast from the ENode and various packets to be communicated between the ENode and an FCoE switch.

Figure 10:
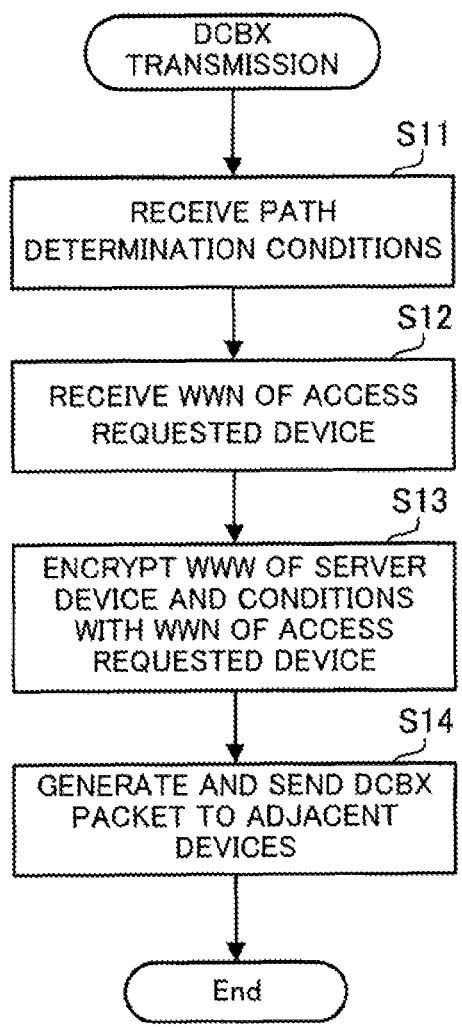
FIG. 10 is a flowchart of how a server device sends a DCBX packet.

The following describes how the storage system 100 operates when the server device 200 accesses a device connected to either one of the FC fabrics 102 and 103. FIG. 10 is a flowchart of how a server device sends a DCBX packet.

At step S11, the DCBX transmission unit 211 of the server device 200 receives path determination conditions entered by the user of the server device 200.

At step S12, the DCBX transmission unit 211 receives the WWN of an access requested device entered by the user of the server device 200.

At step S13, the DCBX transmission unit 211 encrypts the WWN of the server device 200 and the path determination conditions received at step S11, with the WWN of the access requested device received at step S12 as an encryption key.

At step S14, the DCBX transmission unit 211 generates a DCBX packet. More specifically, the DCBX transmission unit 211 stores the encrypted information generated at step S13 in the encrypted region 610 of the DCBX packet, and sets an initial value "0" as the hop count 621 in the unencrypted region 620 of the DCBX packet. The DCBX transmission unit 211 sends the generated DCBX packet to all devices adjacent thereto (CEE switch 300 in the example of FIG. 2) on the CEE fabric 101.

Figure 11:
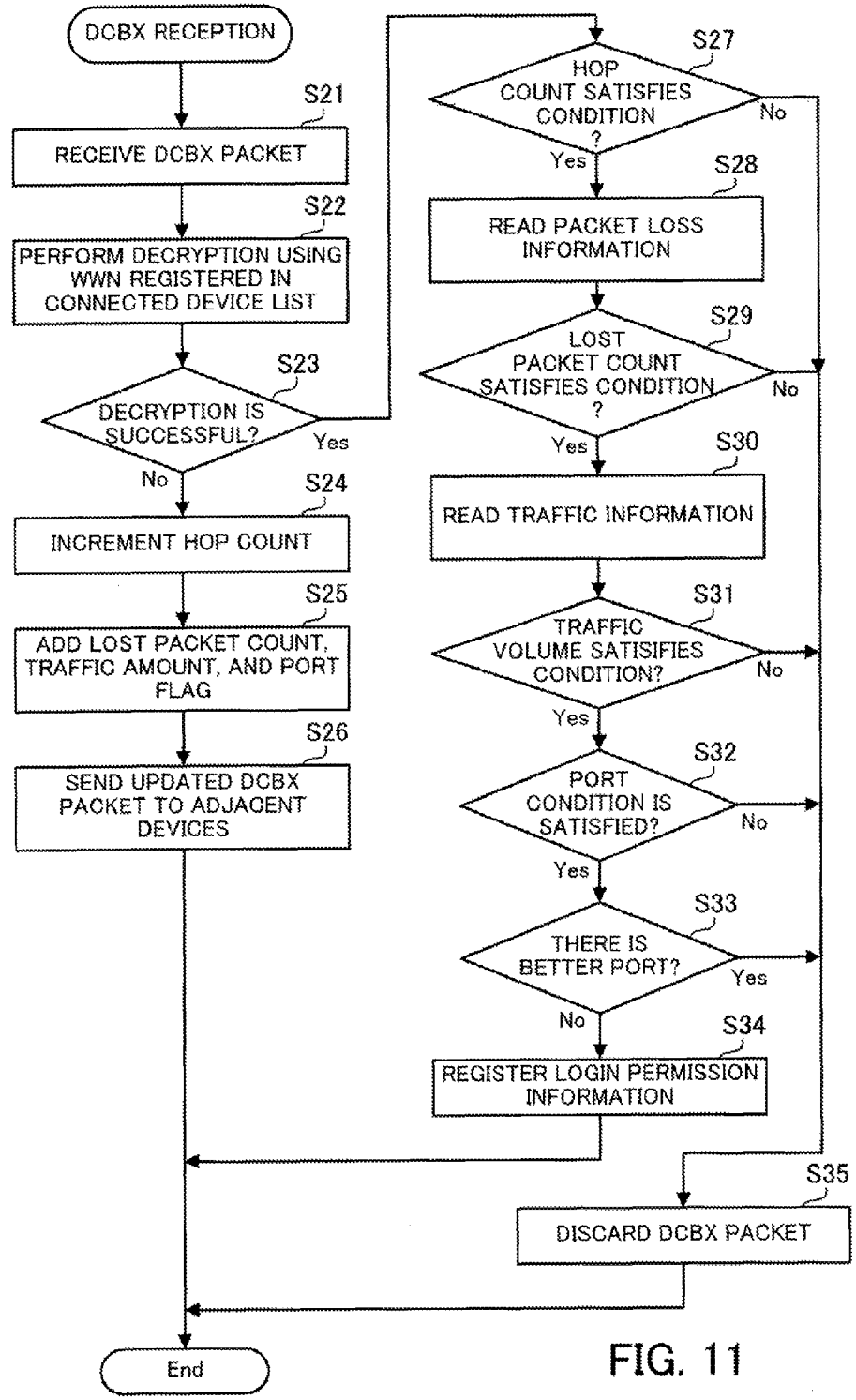
FIG. 11 is a flowchart of how an FCoE switch processes a received DCBX packet.

FIG. 11 is a flowchart of how an FCoE switch processes a received DCBX packet.

The following describes the process of the FCoE switch 400*a* by way of example as the FCoE switches 400*a* and 400*b* operate in the same way. The FCoE switch 400*a* performs this process of FIG. 11 for a LAN port connected to the CEE fabric 101. Referring to the example configuration of FIG. 2, the process of FIG. 11 is performed when a DCBX packet arrives via a LAN port 401 or 402.

At step S21, the DCBX receiving unit 432 of the FCoE switch 400*a* receives a DCBX packet via one LAN port.

At step S22, the DCBX receiving unit 432 reads the WWNs of devices connected to the FC fabric 102 from the connected device list 462 one by one, and decrypts the encrypted region 610 of the DCBX packet received at step S21, with the acquired WWN as a decryption key.

At step S23, the DCBX receiving unit 432 determines whether or not the decryption of step S22 is successful with any one WWN read from the connected device list 462. If the decryption is successful (yes at step S23), the DCBX receiving unit 432 executes step S27; otherwise (no at step S23), the DCBX receiving unit 432 executes step S24.

At step S24, the DCBX receiving unit 432 increments the hop count 621 stored in the unencrypted region 620 of the DCBX packet received at step S21 by one.

At step S25, the DCBX receiving unit 432 reads the number of lost packets of the LAN port via which the DCBX packet was received at step S21, from the packet loss information 451. The DCBX receiving unit 432 adds the acquired number of lost packets to the unencrypted region 620 of the DCBX packet received at step S21 as lost packet count 622.

In addition, the DCBX receiving unit 432 reads an amount of data received by the LAN port via which the DCBX packet was received at step S21, from the traffic information 452. The DCBX receiving unit 432 adds this acquired amount of received data to the unencrypted region 620 of the DCBX packet received at step S21 as traffic volume 623.

In addition, the DCBX receiving unit 432 consults the port group information 461 to determine whether or not the LAN port via which the DCBX packet was received at step S21 and the LAN port via which the updated DCBX packet is to be sent at next step S26 belong to a same port group. If the receiving-side LAN port and the transmission-side LAN port belong to the same port group, the DCBX receiving unit 432 adds a port flag 624 of "0" to the unencrypted region 620 of the DCBX packet received at step S21. If the receiving-side LAN port and the transmission-side LAN port do not belong to the same port group, the DCBX receiving unit 432 adds a port flag 624 of "1" to the unencrypted region 620 of the DCBX packet received at step S21.

Steps S24 and S25 may be executed in reverse order.

At step S26, the DCBX receiving unit 432 sends the DCBX packet having the unencrypted region 620 updated at steps S24 and S25, from all LAN ports except the LAN port via which the DCBX packet was received at step S21, to adjacent devices.

If three or more LAN ports are provided, like the FCoE switch 400a, the updated DCBX packet is sent from two or more LAN ports at step S26. In this case, DCBX packets are individually generated for respective LAN ports. At step S25, the DCBX receiving unit 432 determines, for each LAN port to be used for transmission, whether or not the receiving-side LAN port and the transmission-side LAN port belong to a same port group. Then, the DCBX receiving unit 432 adds a port flag 624 based on the determination result to the DCBX packet corresponding to the LAN port to be used for transmission.

At step S27, as the decryption of the received DCBX packet is successful (yes at S23), the DCBX receiving unit 432 extracts the hop count condition 612 from the decrypted encrypted region 610, and also extracts the hop count 621 from the unencrypted region 620. Then, the DCBX receiving unit 432 determines whether the extracted hop count 621 satisfies the extracted hop count condition 612 or not.

More specifically, the DCBX receiving unit 432 determines that the condition is satisfied if the value of the hop count 621 is equal to or less than the maximum value of the number of switches set as the hop count condition 612. The DCBX receiving unit 432 executes step S28 if the condition is satisfied (yes at S27); otherwise (no at S27), the DCBX receiving unit 432 executes step S35.

At step S28, the DCBX receiving unit 432 reads the lost packet count of the LAN port via which the DCBX packet was received at step S21, from the packet loss information 451.

At step S29, the DCBX receiving unit 432 determines whether or not the communication state of the communication path of the DCBX packet satisfies the packet loss condition 613 extracted from the decrypted encrypted region 610. The DCBX receiving unit 432 executes step S30 if the condition is satisfied (yes at S29); otherwise (no at S29), the DCBX receiving unit 432 executes step S35.

More specifically, the DCBX receiving unit 432 extracts all lost packet counts 622 from the unencrypted region 620 of the DCBX packet, and calculates a total of the all extracted lost packet counts 622 extracted from the unencrypted region 620 and the lost packet count read from the packet loss information 451 at step S28. The DCBX receiving unit 432 then determines that the condition is satisfied if the calculated total is equal to or less than the maximum value of the number of lost packets set as the packet loss condition 613 extracted from the encrypted region 610.

In this connection, a maximum value of the number of lost packets in a LAN port on a communication path may be set as the packet loss condition 613. In this case, the DCBX receiving unit 432 determines that the condition is satisfied if the highest value out of the lost packet counts 622 extracted from the unencrypted region 620 and the lost packet count read from the packet loss information 451 at step S28 is equal to or less than the maximum value set as the packet loss condition 613.

At step S30, the DCBX receiving unit 432 reads the amount of data transmitted/received by the LAN port via which the DCBX packet was received at step S21, from the traffic information 452.

At step S31, the DCBX receiving unit 432 determines whether or not the communication state of the communication path of the DCBX packet satisfies the traffic condition 614 extracted from the decrypted encrypted region 610. The DCBX receiving unit 432 executes step S32 if the condition is satisfied (yes at S31); otherwise (no at S31), the DCBX receiving unit 432 executes step S35.

More specifically, the DCBX receiving unit 432 calculates an average value of all traffic volumes 623 extracted from the unencrypted region 620 and the amount of transmitted/received data read from the traffic information 452 at step S30. The DCBX receiving unit 432 then determines that the condition is satisfied if the calculated average value is equal to or less than the maximum average value set as the traffic condition 614.

In this connection, for example, a maximum value of an amount of data transmitted/received by a LAN port on a communication path may be set as the traffic condition 614. In this case, the DCBX receiving unit 432 determines that the condition is satisfied if the highest value out of the traffic volumes 623 extracted from the unencrypted region 620 and the amount of transmitted/received data read from the traffic information 452 at step S30 is equal to or less than the maximum value set as the traffic condition 614.

Alternatively, both a maximum average value of an amount of transmitted/received data and a maximum value of an amount of data transmitted/received by a LAN port may be set as the traffic condition 614. In this case, the DCBX receiving unit 432 determines that the condition is satisfied if an average value of the traffic volumes 623 is equal to or less than the maximum average value set as the traffic condition 614 and the highest value of the traffic volumes 623 is equal to or less than the maximum value set as the traffic condition 614.

Furthermore, a minimum value of an amount of data transmitted/received by a LAN port on a communication path may be set as the traffic condition 614. In this case, for example, a maximum value and a minimum value of an amount of data transmitted/received by a LAN port may be set in combination as the traffic condition 614. The DCBX receiving unit 432 determines that the condition is satisfied if the highest value and lowest value out of the traffic volumes 623 and the amount of transmitted/received data read at step S30 is equal to or less than the maximum value and the minimum value set as the traffic condition 614, respectively.

At step S32, the DCBX receiving unit 432 extracts the port condition 615 from the decrypted encrypted region 610 and also extracts all port flags 624 from the unencrypted region

620. The DCBX receiving unit 432 determines whether or not the port flags 624 extracted from the unencrypted region 620 satisfy the port condition 615 extracted from the encrypted region 610.

More specifically, the DCBX receiving unit 432 determines that the condition is satisfied if all of the port flags 624 extracted from the unencrypted region 620 are 0. The DCBX receiving unit 432 executes step S33 if the condition is satisfied (yes at S32); otherwise (no at S32), the DCBX receiving unit 432 executes step S35.

At step S33, the DCBX receiving unit 432 determines whether there is a better LAN port other than the LAN port via which the DCBX packet was received at step S21. The DCBX receiving unit 432 executes step S35 if there is a better LAN port (yes at S33); otherwise (no at S33), the DCBX receiving unit 432 executes step S34.

More specifically, the DCBX receiving unit 432 determines whether or not the login permission information 471 has been registered in the flash memory 413. If the login permission information 471 has been registered, the DCBX receiving unit 432 compares the communication state information (that is, the hop count 621, lost packet counts 622, traffic volumes 623, and port flags 624) stored in the login permission information 471 with the communication state information collected from the communication path of the received DCBX packet. The communication state information collected from the communication path of the received DCBX packet is information that includes the hop count 621, lost packet counts 622, traffic volumes 623, and port flags 624 extracted from the DCBX packet received at step S21, and the values read at steps S28 and S30. The DCBX receiving unit 432 determines which communication state information is preferable, and determines that there is a better LAN port if the communication state information stored in the login permission information 471 is more preferable.

Preferable communication state information means that, for example, the values of parameters indicating a communication state are better, such as a smaller hop count, a smaller total value of lost packet counts, and a lower average volume of traffic.

In addition, a priority order for the condition comparison may be given to these traffic condition, packet loss condition, and hop count condition. In this case, the DCBX receiving unit 432 may compare a value extracted from the login permission information 471 with a value collected from the communication path of the received DCBX packet, with respect to a condition in order of priority, and determine a better LAN port depending on which value is preferable if these values are different.

An order of step S27, steps S28 and S29, steps S30 and S31, step S32, and step S33 is not limited to that illustrated in FIG. 11.

At step S34, the DCBX receiving unit 432 registers the host WWN 611 extracted from the DCBX packet received at step S21, the port number of the LAN port via which the DCBX packet was received, and the communication state information collected from the communication path of the DCBX packet, in the flash memory 413 as the login permission information 471. The communication state information collected from the communication path of the DCBX packet is information that includes the hop count 621, lost packet counts 622, traffic volumes 623, and port flags 624 extracted from the DCBX packet received at step S21, and the values read at steps S28 and S30.

At this time, if the login permission information 471 has been registered in the flash memory 413, the DCBX receiving unit 432 updates the existing login permission information 471 with the new login permission information 471.

At step S35, the DCBX receiving unit 432 discards the DBX packet received at step S21 as at least one of steps S27, S29, S31, and S32 yields a result that the condition is not satisfied or step S33 yields a result that there is a better port.

In the above process of FIG. 11, the FCoE switch 400a detects the communication state of the LAN port via which the DCBX packet was received. Alternatively, the FCoE switch 400a may detect the communication state of a LAN port to be used for transmitting the DCBX packet, and adds the information indicating the communication state to the DCBX packet. In this case, the server device 200 which sends the DCBX packet is also provided with a function of monitoring the communication state of a LAN port. Then, when sending the DCBX packet, the server device 200 adds the lost packet count and traffic volume of the LAN port to be used for transmission, to the unencrypted region 620 of the DCBX packet to be sent. In addition, the FCoE switch 400a does not need to perform steps S28 and S30 of FIG. 11, so that there are no values read at steps S28 and S30 to be used for the condition comparison.

In the above process of FIG. 11, if the decryption of the encrypted region 610 is not successful at step S23, the DCBX receiving unit 432 determines that the FC fabric to which the access requested device to be accessed by the ENode belongs is not the FC fabric 102 connected to the own device (in this case, FCoE switch 400a). In this case, the DCBX receiving unit 432 does not register the login permission information 471, but executes steps S24 to S26, thereby transferring the DCBX packet to other adjacent devices. In steps S24 and S25, information indicating the communication state of the LAN port via which the DCBX packet was received is added to the unencrypted region 620 of the DCBX packet to be transferred.

While not illustrated, the DCBX receiving unit 312 of the CEE switch 300 executes the same process as steps S24 to S26 of FIG. 11 when receiving the DCBX packet, thereby transferring the DCBX packet to other adjacent devices. Through such a packet transfer process of the DCBX receiving units 432 and 312, the DCBX packet sent from the server device 200 is successively transferred from one switch to another on the CEE fabric 101. Then, the DCBX packet is received at all LAN ports connected to the CEE fabric 101 in all switches on the CEE fabric 101. In addition, information indicating the communication state of a receiving-side LAN port of each switch is added to the unencrypted region 620 of the DCBX packet every time the DCBX packet passes through the switch.

Through the above packet transfer process, the DCBX packet is sent to all switches existing in the CEE fabric 101, not by multicast. Therefore, every switch is informed of the host WWN 611, path determination conditions, information indicating the communication state of the path, and the like, without regard to the network configuration such as a Virtual LAN (ULAN).

If the decryption of the encrypted region 610 is successful at step S23 of FIG. 11, the DCBX receiving unit 432 of the FCoE switch 400a determines that the FC fabric to which the access requested device belongs is the FC fabric 102 connected to the own device. In this case, the DCBX receiving unit 432 does not transfer the DCBX packet but performs the condition judgment of steps S27, S29, and S31 to S33.

The DCBX receiving unit 432 recognizes the communication state of the communication path along which the received DCBX packet propagated, on the basis of the information stored in the unencrypted region 620 of the received DCBX packet and the information read at steps S28 and S30. The DCBX receiving unit 432 registers the login permission information 471 only when the communication state of the communication path of the DCBX packet satisfies the conditions set in the encrypted region 610. The port number included in the login permission information 471 indicates the LAN port to be used for communication with the ENode after the login request is made from the ENode, as will be described later. The condition comparison regarding the communication state realizes a selection of a communication path with a good communication state as a path for communication with the ENode, thereby making it possible to enhance the reliability of the communication between the ENode, and the FCoE switch 400a and FC fabric 102.

In this connection, in the DCBX packet, the host WWN 611 and path determination conditions are encrypted with the WWN of the access requested device. Therefore, an FCoE switch which receives the DCBX packet is able to determine whether to respond to a future arriving explorer packet. In addition, only the FCoE switch to be logged in is informed of the host WWN 611 and path determination conditions, meaning that such information is not leaked to the other devices connected to the CEE fabric 101. As a result, network security is enhanced.

Figure 12:
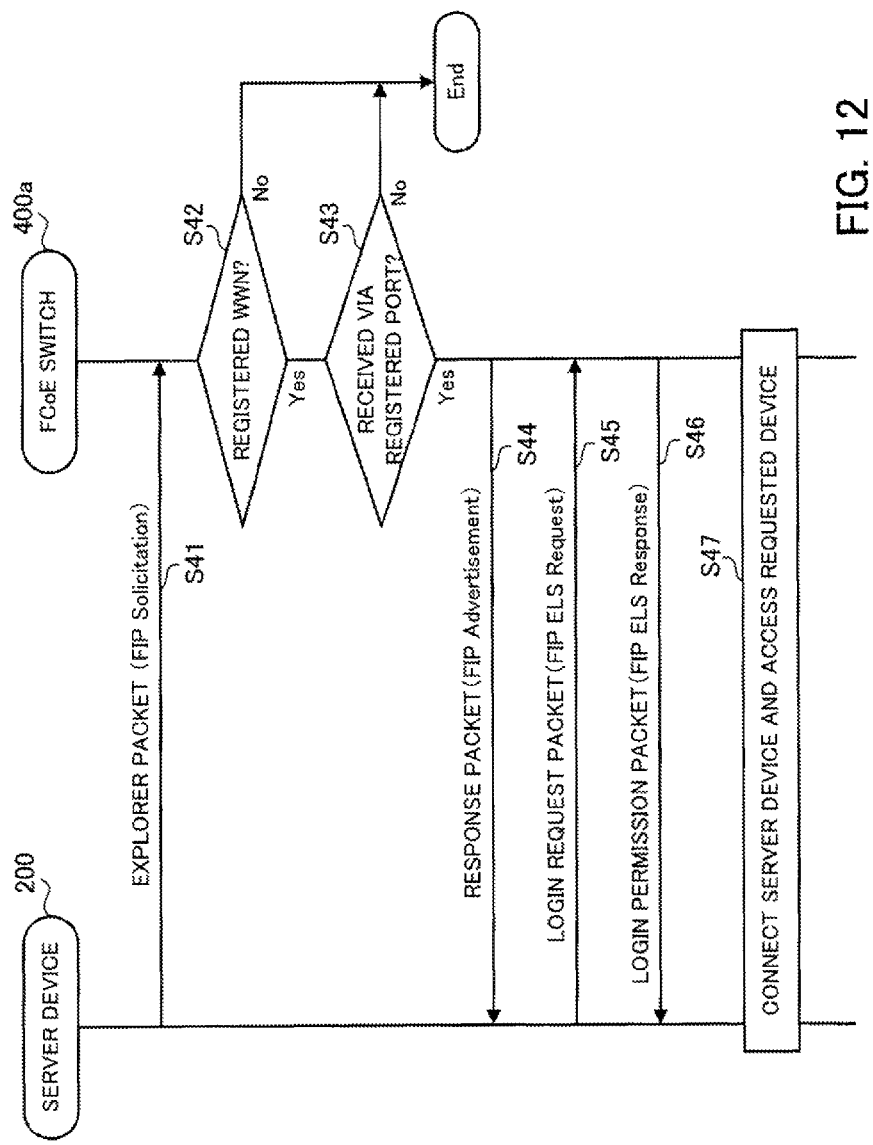
FIG. 12 is a sequence diagram illustrating how a storage system operates after a DCBX packet is sent from the server device.

FIG. 12 is a sequence diagram illustrating how a storage system operates after a DCBX packet is sent from a server device.

At step S41, the login unit 212 of the server device 200 sends an explorer packet by multicast over the CEE fabric 101 to search for an FCoE switch after the DCBX transmission unit 211 sends a DCBX packet. Information transmitted by this explorer packet is called "FIP Solicitation". The explorer packet includes the MAC address and WWN of the server device 200.

The login unit 411 of the FCoE switch 400a receives the explorer packet over the CEE fabric 101. There is a case where the login unit 411 receives the explorer packet sent by multicast, via a plurality of LAN ports connected to the CEE fabric 101. In the example system configuration of FIG. 2, the login unit 411 of the FCoE switch 400a receives, via the LAN port 401, the explorer packet sent from the server device 200 through the CEE switch 300, and also receives, via the LAN port 402, the explorer packet sent from the server device 200 through the CEE switch 300 and the FCoE switch 400b.

At step S42, the login unit 441 of the FCoE switch 400a determines whether the WWN included in the received explorer packet has been registered in the login permission information 471 or not. If the WWN included in the explorer packet has not been registered in the login permission information 471 or if the login permission information 471 itself has not been registered (no at S42), the login unit 441 completes this process. This case means that the access requested device to be accessed by the server device 200 is not connected to the FC fabric 102. If the WWN included in the explorer packet has been registered in the login permission information 471 (yes at S42), on the contrary, step S43 is executed.

At step S43, the login unit 441 determines whether or not the explorer packet was received via a LAN port corresponding to the port number registered in the login permission information 471. If any port number of the LAN ports via which the explorer packet was received has not been registered in the login permission information 471 (no at S43), the login unit 441 completes this process.

If any port number of the LAN ports via which the explorer packet was received has been registered in the login permission information 471 (yes at S43), the login unit 441 performs communication with the server device 200 via the LAN port corresponding to the port number registered in the login permission information 471. Thereby, one communication path is determined for the communication between the FCoE switch 400a and the server device 200.

At step S44, the login unit 441 sends a response packet in response to the explorer packet by unicast to the server device 200. Information transmitted by this response packet is called "FIP Advertisement". The response packet includes the name of the FCoE switch and the name of the FC fabric 102, as well as the MAC address of the FCoE switch 400a.

The login unit 212 of the server device 200 receives the response packet from the FCoE switch 400a. Here, the login unit 212 receives the response packet only from one FCoE switch. Thereby, the server device 200 becomes able to perform communication with the one FCoE switch by using the MAC address of the FCoE switch included in the response packet thereafter.

At step S45, the login unit 212 of the server device 200 sends a login request packet by unicast to the FCoE switch 400a to request login. Information transmitted by the login request packet is called "FIP ELS (Extended Link Service) Request".

At step S46, upon receipt of the login request packet from the server device 200, the login unit 441 of the FCoE switch 400a sends a login permission packet as a response to the packet, by unicast to the server device 200. Information transmitted by this login permission packet is called "FIP ELS Response". The login unit 441 generates a MAC address for FCoE communication to be assigned to the server device 200, and includes the generated MAC address in the login permission packet.

When receiving the login permission packet and acquiring the MAC address for FCoE communication, the login unit 212 of the server device 200 establishes a connection between the server device 200 and the FCoE switch 400a.

At step S47, the connection unit 213 of the server device 200 sets the MAC address for FCoE communication as "VN_Port", which is used for identifying the own device on a FC fabric, and requests the FCoE switch 400a to log in with the FC fabric 102. By responding to the login request, the connection unit 442 of the FCoE switch 400a establishes a connection between the server device 200 and the FC fabric 102. After establishing the connection, the connection unit 442 of the FCoE switch 400a relays data transmitted and received between the connection unit 213 of the server device 200 and the access requested device (for example, storage device 501) to be accessed by the server device 200.

In the above-described storage system 100, using a DCBX packet enables an FCoE switch side to determine whether to respond to an explorer packet. As a result, only one FCoE switch responds to the explorer packet sent by multicast. Therefore, the server device 200 is able to log in to one of a plurality of FCoE switches, without modifying the procedure defined by the FIP standards. This means that the FIP standards are enhanced to cover CEE fabrics each having a plurality of FCoE switches connected thereto.

In addition, using a DCBX packet enables sending of path determination conditions and collecting of the communication state of a communication path. Therefore, an FCoE switch is able to select an optimal communication path to communicate with the server device 200 on the basis of the information stored in the DCBX packet. As a result, the reliability of the communication between the server device 200, and the FCoE switch and a device on an FC fabric may be enhanced.

Furthermore, network security is enhanced as the path determination conditions and the host WWN 611 are encrypted before being sent.

The disclosed communication control apparatus, communication system, information processing apparatus, and communication control method enable an access requesting apparatus to recognize a communication control apparatus connected to a network to which an access requested apparatus belongs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication control apparatus for controlling data communication between a first network and a second network, the communication control apparatus comprising:
    a processor;
    a memory containing program instructions, the processor coupled to the memory executing the program instructions stored on the memory causing the processor to perform a procedure including:
    receiving a first packet sent from an access requesting apparatus over the first network, and upon determining that an access requested apparatus recognized from the received first packet exists in the second network, registering first identification information included in the received first packet in a storage unit of the communication control apparatus, the first packet being generated so as to include the first identification information identifying the access requesting apparatus and to enable communication control apparatuses which receives the first packet over the first network to recognize the access requested apparatus;
    receiving a second packet including the first identification information over the first network, the second packet being sent by multicast to search for a communication control apparatus connected to a network which the access requested apparatus is connected to;
    upon determining that the first identification information included in the received second packet is registered in the storage unit of the communication control apparatus, sending second identification information identifying the communication control apparatus to the access requesting apparatus; and
    upon determining that the first identification information included in the received second packet is not registered in the storage unit of the communication control apparatus, preventing sending of the second identification information to the access requesting apparatus.

2. The communication control apparatus according to claim 1, wherein, upon receipt of the first packet over the first network,
    the processor transfers the received first packet to another apparatus adjacent to the communication control apparatus on the first network upon determining that the access requested apparatus recognized from the received first packet does not exist in the second network; and
    the processor terminates transfer of the received first packet upon determining that the access requested apparatus recognized from the received first packet exists in the second network.

3. The communication control apparatus according to claim 1, wherein:
    the first packet includes the first identification information encrypted with third identification information identifying the access requested apparatus; and
    the processor receives the first packet, consults an apparatus list having registered therein identification information of apparatuses existing in the second network to extract the identification information, and determines that the access requested apparatus exists in the second network connected to the communication control apparatus in a case where the first identification information included in the received first packet is successfully decrypted with the extracted identification information.

4. The communication control apparatus according to claim 1, wherein:
    the first packet includes condition information indicating communication state conditions for a communication path;
    the processor receives the first packet over the first network, and selects a communication path having a communication state satisfying the condition information included in the received first packet upon determining that the access requested apparatus recognized from the received first packet exists in the second network; and
    the processor receives the second packet over the first network, and determines the selected communication path as a communication path to communicate with the access requesting apparatus upon determining that the first identification information included in the received second packet is registered in the storage unit.

5. The communication control apparatus according to claim 4, wherein:
    upon determining that the access requested apparatus recognized from the received first packet does not exist in the second network, the processor adds communication state information to the first packet and transfers the first packet, the communication state information indicating a communication state of a communication port which the first packet passed through out of communication ports of the communication control apparatus; and
    upon determining that the access requested apparatus recognized from the received first packet exists in the second network, the processor detects a communication state of a communication path of the first packet on a basis of the communication state information included in the first packet, and selects the communication path having the detected communication state satisfying the condition information included in the first packet.

6. The communication control apparatus according to claim 4, wherein upon receiving the second packet through the selected communication path and determining that the first identification information included in the second packet received through the selected communication path is registered in the storage unit, the processor sends the second identification information to the access requesting apparatus through the selected communication path.

7. The communication control apparatus according to claim 4, wherein:
    the first packet includes the first identification information and the condition information which are encrypted with third identification information identifying the access requested apparatus; and the processor receives the first packet, consults an apparatus list having registered therein identification information of apparatuses existing in the second network to extract the identification information, and determines that the access requested apparatus exists in the second network connected to the communication control apparatus in a case where the first identification information and condition information included in the received first packet are successfully decrypted with the extracted identification information.

8. communication system comprising: an information processing apparatus connected to a first network; and a plurality of communication control apparatuses connected to respective ones of other networks different from the first network for controlling data communication between the first network and said respective ones of other networks connected to the communication control apparatuses, wherein:
the information processing apparatus generates a first packet so as to include first identification information identifying the information processing apparatus and to enable communication control apparatuses which receives the first packet over the first network to recognize an access requested apparatus connected to one of said other networks, and sends the generated first packet over the first network, and sends a second packet including the first identification information over the first network after the first packet is sent;
one of the plurality of communication control apparatuses receives the first packet over the first network, and upon determining that the access requested apparatus recognized from the received first packet exists in a second network connected to the one of the plurality of communication control apparatuses, registers the first identification information included in the received first packet in a storage unit of the one of the plurality of communication control apparatuses, receives the second packet over the first network, upon determining that the first identification information included in the received second packet is registered in the storage unit of the one of the plurality of communication control apparatuses, sends second identification information identifying the one of the plurality of communication control apparatuses to the information processing apparatus, and upon determining that the first identification information included in the received second packet is not registered in the storage unit of the one of the plurality of communication control apparatuses, prevents sending of the second identification information to the access requesting apparatus; and
the second packet is sent by multicast to search for a communication control apparatus connected to a network which the access requested apparatus is connected to.

9. The communication system according to claim 8, wherein:
the one of the plurality of communication control apparatuses transfers the received first packet to another apparatus adjacent to the one of the plurality of communication control apparatuses on the first network upon determining that the access requested apparatus recognized from the received first packet does not exist in the second network; and
the one of the plurality of communication control apparatuses terminates transfer of the received first packet upon determining that the access requested apparatus recognized from the received first packet exists in the second network.

10. The communication system according to claim 8, wherein:
the information processing apparatus stores, in the first packet, the first identification information encrypted with third identification information identifying the access requested apparatus; and
the one of the plurality of communication control apparatuses receives the first packet, consults an apparatus list having registered therein identification information of apparatuses existing in the second network to extract the identification information, and determines that the access requested apparatus exists in the second network connected to the one of the plurality of communication control apparatuses in a case where the first identification information included in the received first packet is successfully decrypted with the extracted identification information.

11. The communication system according to claim 8, wherein:
the information processing apparatus stores condition information indicating communication state conditions for a communication path in the first packet;
the one of the plurality of communication control apparatuses selects a communication path having a communication state satisfying the condition information included in the received first packet upon determining that the access requested apparatus recognized from the received first packet exists in the second network; and
the one of the plurality of communication control apparatuses determines the selected communication path as a communication path to communicate with the information processing apparatus upon determining that the first identification information included in the received second packet is registered in the storage unit.

12. The communication system according to claim 11, wherein:
upon determining that the access requested apparatus recognized from the received first packet does not exist in the second network, the one of the plurality of communication control apparatuses adds communication state information to the first packet and transfers the first packet, the communication state information indicating a communication state of a communication port which the first packet passed through out of communication ports of the one of the plurality of communication control apparatuses; and
upon determining that the access requested apparatus recognized from the received first packet exists in the second network, the one of the plurality of communication control apparatuses detects a communication state of a communication path of the first packet on a basis of the communication state information included in the first packet, and selects the communication path having the detected communication state satisfying the condition information included in the first packet.

13. The communication system according to claim 8, wherein the information processing apparatus sends the second packet by multicast over the first network.

14. The communication system according to claim 8, wherein the information processing apparatus uses, upon receipt of the second identification information, the received second identification information to request the communication control apparatus identified by the second identification information to connect to one of said other networks connected to the communication control apparatus.

15. A communication control method for a communication control apparatus connected to a first network and a second network, the communication control method comprising:
- receiving, by the communication control apparatus, a first packet sent from an access requesting apparatus over the first network, and upon determining that an access requested apparatus recognized from the received first packet exists in the second network, registering first identification information included in the received first packet in a storage unit of the communication control apparatus, the first packet being generated so as to include the first identification information identifying the access requesting apparatus and to enable communication control apparatuses which receives the first packet over the first network to recognize the access requested apparatus;
- receiving, by the communication control apparatus, a second packet including the first identification information over the first network, the second packet being sent by multicast to search for a communication control apparatus connected to a network which the access requested apparatus is connected to;
- upon determining that the first identification information included in the received second packet is registered in the storage unit of the communication control apparatus, sending, by the communication control apparatus, second identification information identifying the communication control apparatus to the access requesting apparatus; and upon determining that the first identification information included in the received second packet is not registered in the storage unit of the communication control apparatus, preventing, by the
- communication control apparatus, sending of the second identification information to the access requesting apparatus.

16. The communication control method according to claim 15, wherein, upon receipt of the first packet over the first network,
- the communication control apparatus transfers the received first packet to another apparatus adjacent to the communication control apparatus on the first network upon determining that the access requested apparatus recognized from the received first packet does not exist in the second network, and
- the communication control apparatus terminates transfer of the received first packet upon determining that the access requested apparatus recognized from the received first packet exists in the second network.

17. The communication control method according to claim 15, wherein:
- the first packet includes the first identification information encrypted with third identification information identifying the access requested apparatus; and
- the communication control apparatus receives the first packet over the first network, consults an apparatus list having registered therein identification information of apparatuses existing in the second network to extract the identification information, and determines that the access requested apparatus exists in the second network connected to the communication control apparatus in a case where the first identification information included in the received first packet is successfully decrypted with the extracted identification information.

18. The communication control method according to claim 15, wherein:
- the first packet includes condition information indicating communication state conditions for a communication path;
- the communication control apparatus receives the first packet over the first network, and selects a communication path having a communication state satisfying the condition information included in the received first packet upon determining that the access requested apparatus recognized from the received first packet exists in the second network; and
- the communication control apparatus receives the second packet over the first network, and determines the selected communication path as a communication path to communicate with the access requesting apparatus upon determining that the first identification information included in the received second packet is registered in the storage unit.

\* \* \* \* \*